United States Patent
Saudagar et al.

(10) Patent No.: US 12,244,517 B1
(45) Date of Patent: Mar. 4, 2025

(54) METHOD AND SYSTEM FOR COMPUTATIONAL RESOURCE MANAGEMENT IN FOG COMPUTING ENABLED INTERNET OF THINGS NETWORK

(71) Applicant: IMAM MOHAMMAD IBN SAUD ISLAMIC UNIVERSITY, Riyadh (SA)

(72) Inventors: Abdul Khader Jilani Saudagar, Riyadh (SA); Muhammad Awais Javed, Riyadh (SA); Ahmad Naseem Alvi, Riyadh (SA); Abdullah Altameem, Riyadh (SA); Muhammad Badruddin Khan, Riyadh (SA); Mohammed Alkhathami, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/657,591

(22) Filed: May 7, 2024

(51) Int. Cl.
*H04L 47/70* (2022.01)
*G16Y 10/75* (2020.01)
*G16Y 40/35* (2020.01)

(52) U.S. Cl.
CPC ............ *H04L 47/829* (2013.01); *G16Y 10/75* (2020.01); *G16Y 40/35* (2020.01)

(58) Field of Classification Search
None
See application file for complete search history.

(56) References Cited

U.S. PATENT DOCUMENTS

| | | | |
|---|---|---|---|
| 2017/0337339 A1* | 11/2017 | Cronin | G16H 40/63 |
| 2019/0245806 A1* | 8/2019 | Hanes | H04L 47/781 |
| 2020/0186607 A1* | 6/2020 | Murphy | G06Q 40/12 |
| 2021/0370168 A1* | 12/2021 | Kamphuis | A63F 13/335 |

(Continued)

FOREIGN PATENT DOCUMENTS

KR     10-2056894 B1     12/2019

OTHER PUBLICATIONS

Malik, U., et al., "Efficient Matching-Based Parallel Task Offloading in IoT Networks", sensors, 2022, pp. 1-22.

(Continued)

*Primary Examiner* — Oleg Survillo
*Assistant Examiner* — Christopher P Cadorna
(74) *Attorney, Agent, or Firm* — Oblon, McClelland, Maier & Neustadt, L.L.P.

(57) ABSTRACT

A system and method for managing resources for computation in an Internet of Things (IoT) environment. The system includes wireless devices, Fog servers, and a centralized Fog node controller, each connected by a wireless communication network. Communication over the communication network uses millimeter wave or submillimeter wave signals. The wireless devices generate application-related IoT tasks. The Fog servers provide computation resources to the IoT tasks, where each of the IoT tasks are of various sizes, in bytes, and have compute resource requirements. The Fog node controller manages computation of the IoT tasks, for each Fog server, subject to a predetermined number of Fog server computation cycles that are performed in parallel.

19 Claims, 9 Drawing Sheets

(56) References Cited

U.S. PATENT DOCUMENTS

2023/0325656 A1* 10/2023 Li .......................... G06N 3/09
2024/0259905 A1*  8/2024 Sen .................... H04W 36/302

OTHER PUBLICATIONS

Malik, U., et al., "Ambient Intelligence assisted fog computing for industrial IoT applications", ScienceDirect, vol. 196, 2022, pp. 1-5.
Alfakeeh, A., et al., "Stable Matching Assisted Resource Allocation in Fog Computing Based IoT Networks", mathematics, 2023, pp. 1-15.

* cited by examiner

METHOD AND SYSTEM FOR COMPUTATIONAL RESOURCE MANAGEMENT IN FOG COMPUTING ENABLED INTERNET OF THINGS NETWORK

BACKGROUND

Technical Field

The present disclosure is directed to communication networks and computing. In particular, the present disclosure is related to the Internet of Things, and Computing Servers particularly fog computing.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Internet of Things (IoT) technologies along with wireless communication systems, data communications, Artificial Intelligence (AI), and learning techniques have enabled efficient machine-to-machine communications. Because of these advancements, lifestyles have evolved and now it is desired to access all information and control all devices online via a single device. As a consequence, many new devices are getting Internet connectivity at a very rapid pace.

Cloud computing has been at the center stage to serve IoT technologies, but cloud computing being a centralized solution, is foreseen to be inefficient to meet extreme low-latency requirements of future applications. A cloud service has the highest latency but is highly scalable. Also computing power is high and interoperability is high. In contrast, fog computing has been introduced as a solution to improve latency in cloud computing, as it brings computing and resources for storage within neighborhood of IoT nodes.

Figure 1:
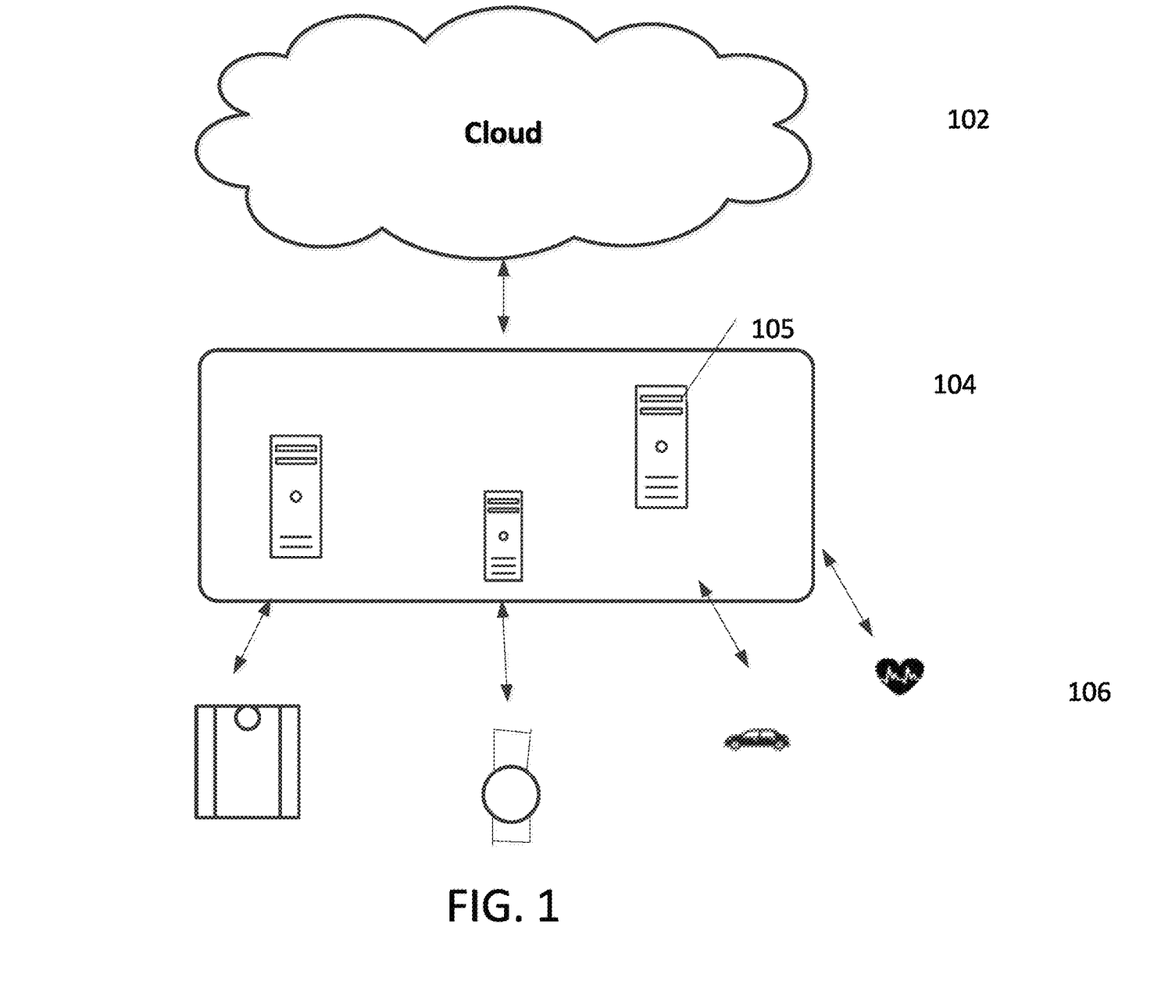
FIG. 1 is a system diagram of fog computing.

FIG. 1 illustrates fog computing. Fog computing involves a layer of distributed fog nodes 104 between edge devices 106, such as IoT nodes and a cloud service 102. The fog layer consists of nodes 105 with numbers in the high thousands or few millions worldwide.

Fog nodes are typically independent devices that pick up information generated by IoT devices. Fog nodes can include fog devices, fog servers, and gateways. The fog devices store necessary data while fog servers also compute this data to decide a course of action. Fog devices are usually linked to the fog servers. Fog gateways redirect the information between the various fog devices and servers.

A fog layer has medium latency and is scalable within the fog layer. The fog layer has high interoperability. However, the fog nodes have limited computing power and preferably minimize energy usage.

The IoT itself has low latency but is difficult to scale. Computing power of IoT devices is very limited and interoperability between the IoT devices is low. IoT devices serve as the points of contact to the external world. IoT devices can include application servers, edge routers, end mobile devices such as smartphones and smartwatches, various sensors, and even cars equipped with wireless communications. These devices generate data and can span a large spectrum of technology. This means they may have varying storage and processing capacities and different underlying software and hardware.

The fog computing infrastructure allows developers and operators to make a compromise between cloud and edge computing. Nodes in the fog can act as handlers between IoT nodes and the cloud service. Sensitive information can be stored locally on fog servers and never be forwarded to the cloud. The urgency of a request can be determined on fog nodes. Under normal circumstances, networking bandwidth and computing resources are spared in the cloud by storing data locally whenever necessary and storing data in the cloud when the localization of data is of no concern.

One example of a tradeoff between cloud and edge computing is a case where data is sent by a temperature sensor in a factory. The temperature recording can be pushed to the cloud every second with a service checking for fluctuations. But a more intelligent way of storing this information would be to check if there have been any temperature changes in the last few seconds. Data can be pushed to the cloud, only as necessary when a temperature change is detected, for storage to verify the proper operation of the production line. This kind of scenario is also common with devices such as surveillance video cameras that produce large quantities of video and audio data. Video and audio data that is sent to the cloud can be limited to data that meets certain conditions, such as when there is movement or detection of new objects, etc.

The fog nodes are physically close to the IoT nodes and are used to bring computing resources closer to the edge. This proximity of fog nodes to IoT nodes enables them to offload their computation tasks and store data onto these fog nodes with improved latency and low energy requirements. However, there are challenges related to computational offloading to fog nodes. In fog computing, the challenges related to computational offloading, and resource allocation have been under the spotlight for several years. The computational offloading requires offloading for multiple tasks with various delay requirements for the end-users. The heterogeneity and large number of devices are challenges to obtaining optimized resource allocation. Issues including delay and energy consumption must be considered. Existing task offloading approaches have been unable to reduce computational complexity and provide stable performance.

Most research in offloading has focused on the objective functions of improving task computational delay or achieving energy efficiency. These objectives are achieved, typically by managing the offloading technique through tailored network policies. These offloading techniques carefully select the size of a task (e.g., bytes) and the location where to offload the task, that best suits achieving its desired objectives.

When making the offloading decision, the whole task can be considered as an entity or it can be broken into a variable-sized smaller tasks according to the offloading technique, also called binary offloading problem and partial offloading problem, respectively. Binary offloading is considered a preferred task offloading technique as partial offloading is complex to handle. In either case, task offloading is a challenging task as multiple IoT nodes have several tasks. Furthermore, the computational resources of fog nodes are limited.

Accordingly, it is one object of the present disclosure to provide a method and system for allocating computational resources of fog nodes for efficiently offloading tasks from IoT nodes provided the limited computational resources of fog nodes. An object is to offload tasks in the face of limited fog computing resources but with a reduction in communication and computation delay for Internet of Things tasks.

SUMMARY

An aspect of the present disclosure is a system for managing resources for computation in an Internet of Things (IoT) environment, that can include a plurality of wireless devices having respective antennas with operating frequency in a range 3 GHz to 10 THz, wherein the wireless devices include at least one mobile device; a plurality of Fog servers having respective antennas with operating frequency in a range 3 GHz to 10 THz; a Fog node controller; and a wireless communication network for communication, by millimeter waves or submillimeter waves, between the plurality of wireless devices, the plurality of Fog servers and the Fog node controller, where distance between the at least one mobile device and Fog servers varies and is dynamic, wherein the plurality of wireless devices are configured to generate application-related IoT tasks, wherein the Fog servers are configured to provide computation resources to the IoT tasks, where each of the IoT tasks are of various sizes, in bytes, and have compute resource requirements, and wherein the Fog node controller is configured to manage computation of the IoT tasks, for each Fog server, subject to a predetermined number of Fog server computation cycles that are performed in parallel.

In another aspect of the present disclosure, a method of managing resources for computation in an Internet of Things (IoT) environment, can include generating a plurality of tasks, by a plurality of wireless devices having respective antennas having operating frequency in a range 3 GHz to 10 THz, wherein each of the plurality of tasks have a size, in bytes, and have compute resource requirements; matching, by a central controller, wireless devices and Fog servers based on a IoT preference list of IoT task preferences for each Fog server and a Fog server preference list of Fog server preferences for each IoT task; offloading the plurality of tasks from respective wireless devices to matched Fog servers; determining an order of task computation, among the generated plurality of tasks, in each Fog server using a knapsack algorithm with a knapsack representing limited compute resources of a Fog server; executing, in the Fog server, the tasks in the determined order of task computation; and transmitting results of task execution to the respective wireless devices that offloaded the task.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Aspects of this disclosure are directed to a system and method for computational resource management in fog-based Internet of Things networks. The method uses three different components in the network including IoT nodes, Fog node controllers and Fog nodes. The IoT node generates tasks and assigns a priority to each task. The fog node controller maintains a signal strength table for each IoT node to fog node transmission. The fog node controller runs a matching technique to associate IoT nodes with the fog nodes. Further, the fog nodes also run a 0/1 Knapsack algorithm to assign tasks in its fog node queue to the current computational cycle. The developed method reduces the computational delay of tasks.

The disclosed system and method provide a solution to IoT environments that involve execution of urgent tasks among a large number of tasks.

Figure 2:
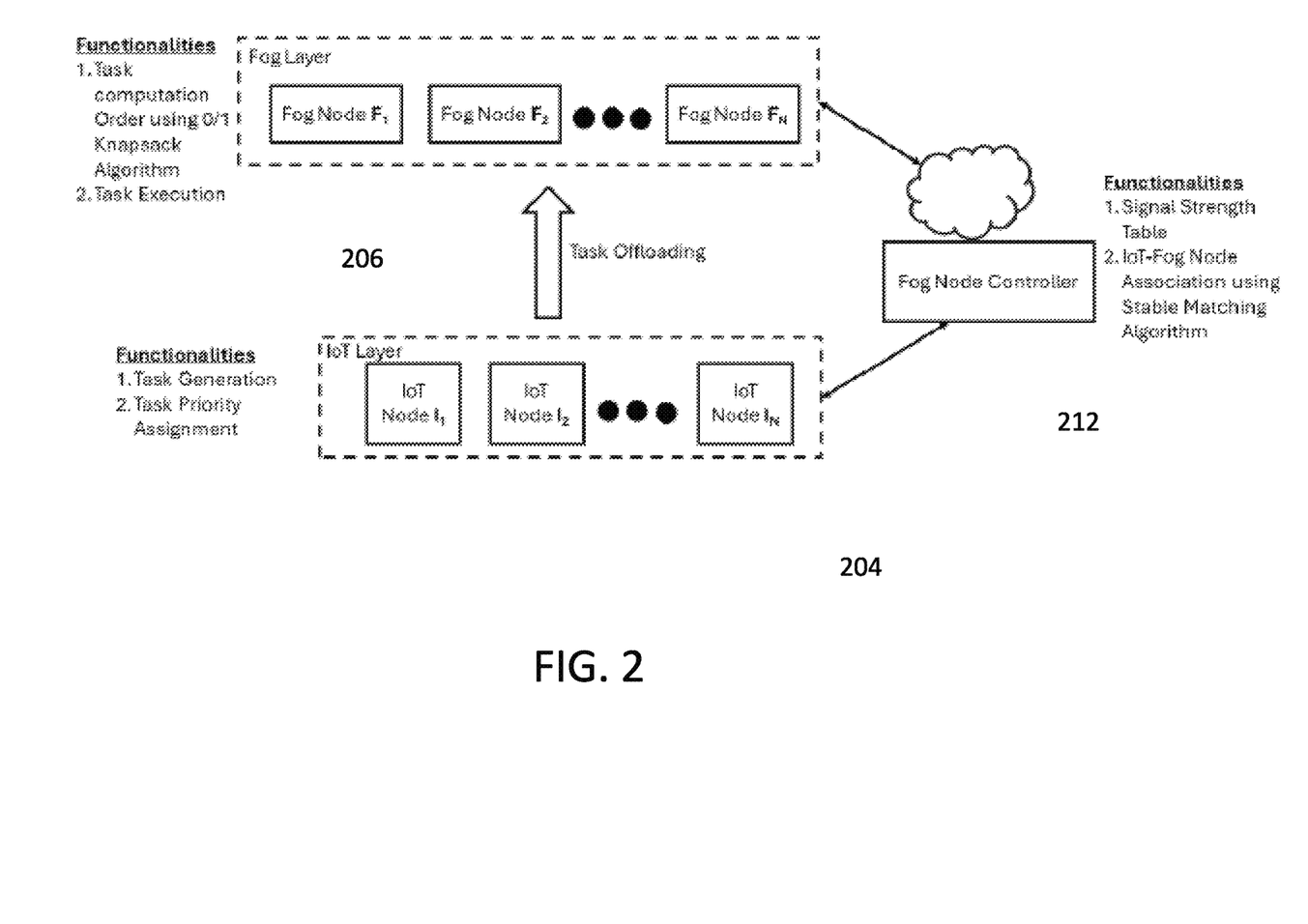
FIG. 2 is a diagram of software modules for computational resource management in a Fog-based IoT network.

FIG. 2 is a diagram of software modules for computational resource management in a Fog-based IoT network. There are three major modules in the network. The first module is the IoT node 204 that generates different application-related tasks. The second module is the fog nodes 202 that have provided their computing resources to the IoT nodes 204 and compute tasks on behalf of the IoT nodes 204. The third module is the Fog node controller 212 which is a central server placed in the network. The role of the fog node controller 212 is the attachment of tasks to the fog computing nodes 202.

At first, the IoT nodes 204 generate their tasks each of which has different sizes (in terms of bytes) and has different computing requirements (in terms of number of cycles). Each IoT node 204 also assigns a priority to its tasks. This priority is based on how urgent the task computation is. For example, in an industrial IoT network, machine failure-related tasks are urgent whereas tasks related to regular machine status are not of high urgency. In one embodiment, the tasks are divided into three levels of priority namely, low, medium, and high. It is understood that the levels of priority can be more than these three levels, such as low, medium-low, medium, medium-high, and high. The levels of priority can include an Emergency level as well. These two functionalities of IoT nodes are depicted in FIG. 2.

The fog controller node 212 is the second component in the network. It maintains a table of signal strengths of all IoT-fog node pairs. This signal strength is initially calculated based on the distance between two nodes and a received power formula in wireless communications. The position information of IoT nodes is transmitted as part of task generation request to the fog controller. Once the network is set up, the actual signal strengths when data is shared between IoT devices and fog servers are determined and average signal strength is maintained. The second responsibility of the fog node controller 212 is to use the matching technique to associate IoT devices with the best fog servers. This is done by using a stable matching algorithm.

The third component of the network is the fog server node 202. The fog server node 212 has two major responsibilities. The first is that it applies a Knapsack algorithm using received (offloaded) tasks and finds the order of tasks that will be executed in the current cycle duration. In other words, the size of the knapsack is the number of cycles that a fog server 202 can use to compute tasks. Each fog server 202 only has a certain number of cycles that can be used to compute tasks in parallel. The remaining tasks are moved for execution in the next cycle. The second functionality of the fog server 202 is that it executes the tasks and sends back the results to the IoT nodes 204.

Figure 3:
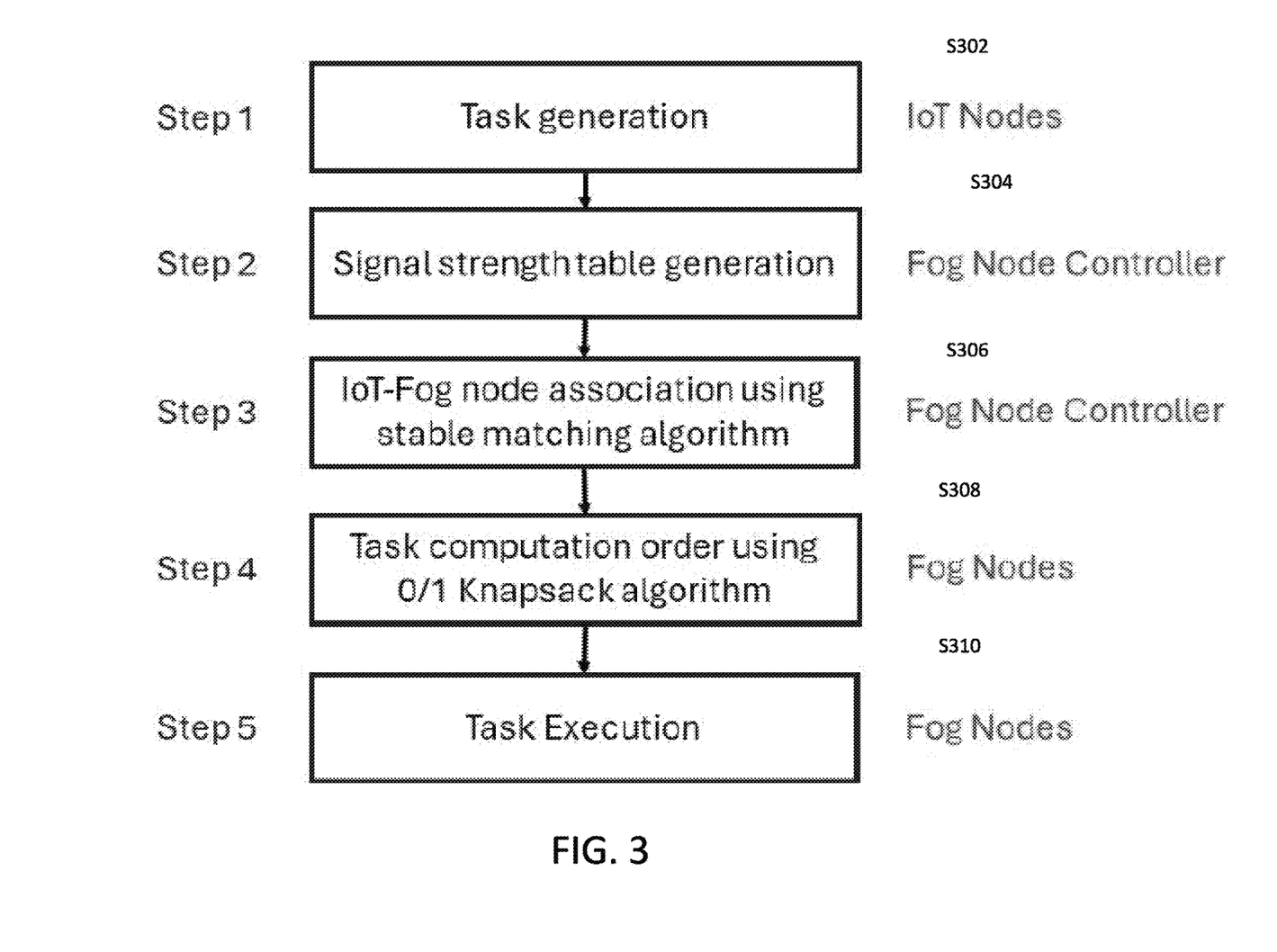
FIG. 3 is a flowchart of a method of task computing in a Fog-based IoT network.

The steps of the task computing algorithm are shown in the flowchart of FIG. 3. In the task computing algorithm, tasks are allocated to minimize the transmission delay while keeping in view task priority. The task computing algorithm uses stable matching with preference profiling to reduce transmission delay. A preference profile is developed for both IoT nodes and fog nodes. At IoT nodes, signal strength and fog node available computational capacity are used to generate a IoT preference profile. Similarly, at the fog nodes, task priority and task generation time are used to assign preference order. The preference profile reduces task computation delay.

In performing the offloading, a single atomic task is offloaded to a single fog node. The Fog Node Controller 212 has a resource allocation algorithm embedded in its hardware.

Referring to FIG. 3, the task computing algorithm is described as follows:
Step S302: Task Generation Executed in Each IoT Node This step is performed by the IoT nodes 204. Different application-related tasks are generated by IoT nodes 204, and they require computation.
Step S304: Signal Strength Table Generation This step is executed on the Fog Node Controller 212. The signal strength is evaluated for each IoT-Fog node pair. The signal strength (SS) can be evaluated by $$SS = \frac{\text{Transmit Power} \times \text{Antenna gains} \times \lambda^2}{(4\pi D)^2} \quad (1)$$

Here, transmit power is of the wireless transceiver of IoT Antenna gains are the product of transmitter side and receiving side antenna gains.

Δ is the wavelength of the signal.

D is the distance between the IoT devices and fog servers.
Step S306: IoT Fog Node Associating Using a Stable Matching Algorithm, Executed on Fog Node Controller 212.

Figure 4:
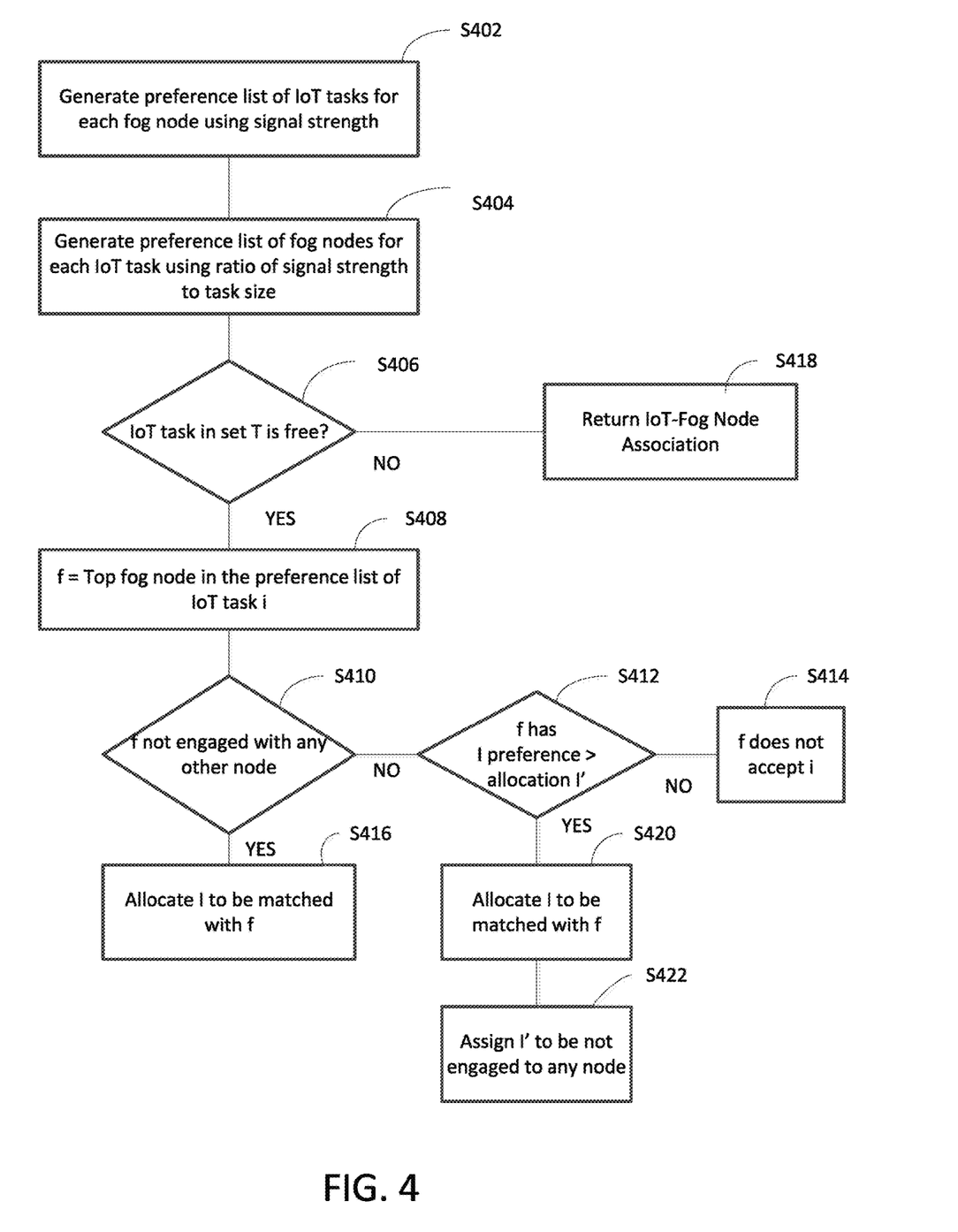
FIG. 4 is a flowchart of a method of IoT-Fog node association.

In this step, the IoT nodes 204 are associated with fog servers 202 utilizing the stable matching algorithm as shown in the flowchart of FIG. 4. The algorithm used for stable matching is utilized to assign several IoT nodes 204 per single fog node 202. Here the preference profiles are calculated as follows:
Preference Profile of IoT Nodes IoT nodes 204 use signal strength as a measure of their preference order towards the fog node 202. This is because IoT nodes want to select fog nodes that have the highest signal strength and data rate so that the transmission time of the task is reduced.

Preference Profile of Fog Nodes

Fog nodes 202 use signal strength divided by the task size (in bytes) as a measure of their preference order towards the IoT nodes 204. This is because fog nodes 202 have a preference to select tasks with the highest signal strengths and also tasks that are smaller in size to conserve their computational power.

Figure 5A:
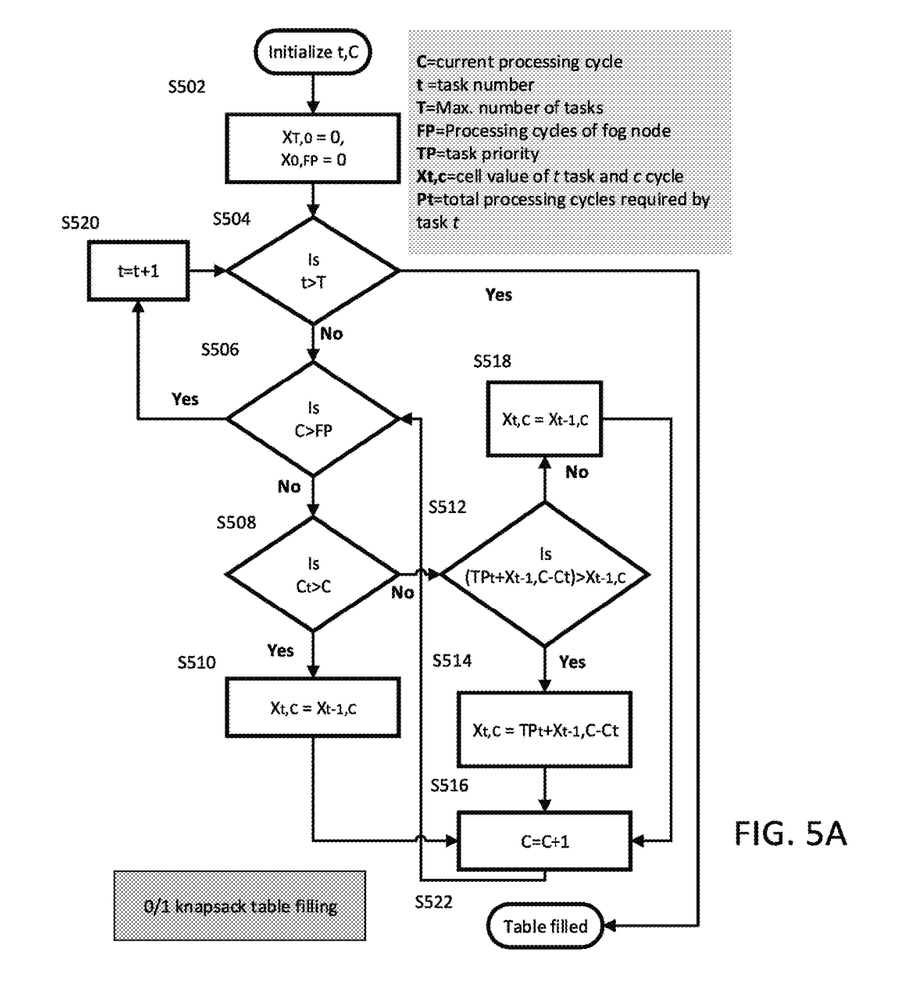
FIGS. 5A, 5B is a flowchart of a method of task computation order selection using a knapsack algorithm.
Figure 5B:
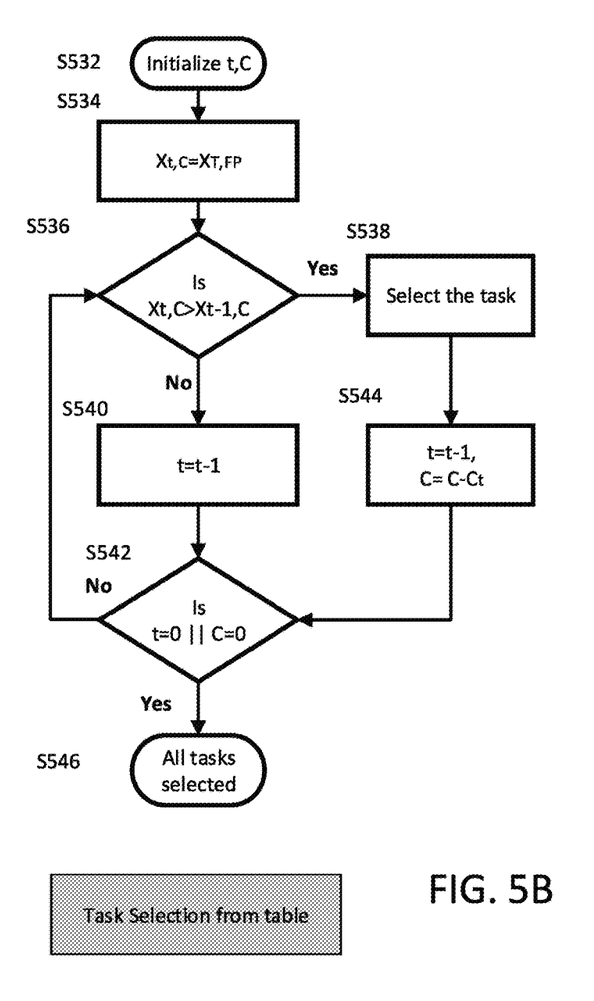

Finally, IoT tasks are assigned to the fog servers 202 with the help of a matching algorithm and tasks are offloaded for computation. IoT nodes transmit their task to the allocated fog node using 5G wireless communication technology.
Step S308: Task Computation Order Using 0/1 Knapsack Algorithm In this step, the task computation order at each fog node 202 is established using the 0/1 Knapsack algorithm as shown in FIGS. 5A, 5B. The knapsack algorithm is performed on each Fog node 202.
Step S310: Task Execution In this step, fog nodes 202 execute the selected tasks from step S308 in the current cycle set.

FIG. 4 is a flowchart of the IoT-Fog Node association algorithm using a stable matching algorithm, herein referred to as the stable matching algorithm. The stable matching algorithm is executed in the Fog node controller 212 and begins with preference generation steps. Step S402 generates a preference list of all IoT tasks for each fog node using signal strength. Step S404 generates a preference list of all fog nodes for each IoT task using a ratio of signal strength and task size (bytes).

The Fog node controller 212 can initialize each IoT task I in set T and fog node resource f in set F to be free. In S406, a decision is checked as to whether any IoT task in set T is free. While true in S406, in S410, a decision is made as to whether f is not engaged with any other node (where in S408, f is a top fog node in the preference list of I whom it has not proposed). If true in S410, in S416, allocate I to be matched with f.

Otherwise, in step S412, a decision is made as to whether f has i at a higher preference order than its current allocation i'. If true at S412, in step S420, allocate i to be matched with f, and in step S422, assign i' to be not engaged to any node. If not true at step S412, in step S414, f does not accept the proposal of i.

At a point, where the decision at step S406 is no longer true, in step S418, the algorithm performed on the Fog node controller 212 returns the resulting IoT-Fog node association.

FIGS. 5A and 5B is a flowchart of task computation order selection executed on a Fog node for each IoT device. A Knapsack algorithm is used to find the task computation order. In the Knapsack algorithm, task size, task priority and task generation time are considered to allocate computation cycles of fog nodes to the IoT tasks. The task computation order algorithm is based on a 0/1 Knapsack algorithm. The knapsack algorithm is a resource allocation algorithm where a choice is made from a set of tasks under a time constraint, in particular number of processing cycles of a fog node. In the 0/1 Knapsack algorithm, the number of copies of each kind of task is restricted to zero or one. The algorithm fills the knapsack so that the sum of the values of tasks is less than or equal to the knapsack's capacity.

The flowchart is drawn to simplify the amount of information in each block. In the flowchart, C represents the current processing cycle, t represents the task number, T represents the maximum number of tasks, FP represents the processing cycles of a fog node, TP represents the task priority, xt, c represents the cell value of task t and cycle c, Pt represents the total processing cycles required by task t.

FIG. 5A is a flowchart of a knapsack table filing method. In step S502, the cell value of task t and the processing cycles of the fog node FP are initialized to 0.

In S504, a decision is made to determine if the task number t has exceeded the maximum number of tasks T.

While the task number t is less than of equal to the maximum number of tasks T (No in S504), in step S506, a decision is made as to whether the current processing cycle C is greater than the processing cycles of the fog node FP.

While the current processing cycle C is less than or equal to the processing cycles of the fog node FP (NO in S506), in S508, a decision is made as to whether Q is greater than the current processing cycle C. If true (YES at S508), in step S510, the value of the current cell will be filled with the same value of its upper cell value. In step S516, the current processing cycle is incremented, and the process goes back to step S506.

In step S508, when Q becomes less than or equal to the current processing cycle C (NO in S508), in step S512, a decision is made as to whether the task priority TP+cell value of task t and cycle c is greater than a cell value a cycle c.

If true (YES at S512), in step S514, fill the cell with the combined value of task priority and the specific cell value placed in the upper row. In step S516, the current processing cycle is incremented, and the process goes back to step S506.

If the decision at step S512 is false (NO at step S512), in step S518, fill the cell with the same as mentioned in the upper row with same column (Xt−1,C), the process goes to step S516, to increment the current processing cycle, and repeat S506.

The process is repeated until the current processing cycle C is greater than processing cycles of frog node FP (YES at S506). In step S520, the task number is incremented, and the decision step S504 checks whether the task number exceeds the maximum number of tasks T.

When step S504 determines that the task t is greater than the maximum number of tasks T (YES at S504), in S522, the knapsack table has been filled.

FIG. 5B is a flowchart of a method of task selection from the knapsack table.

In step S532, the task number t and current processing cycle C are initialized.

In step S534, the cell value at t, C are set to maximum task number T and processing cycles of frog node FP.

In step S536, a decision is made as to whether the cell value at t, C is greater than the cell value at t−1, C. If the decision is true (YES at S536), in step S538, a task is selected.

Otherwise (NO in S536), in S540, task number t is incremented. In step S544, task number t is set to task number t*1l[t−1] and current processing cycle C is set to C*Ct.

In step S542, a decision is made as to whether task number has reached 0 or current processing cycle has reached zero. If not (NO at S542), the process returns to step S536.

Otherwise (YES in S542), in S546, all tasks have been selected, and the task computation order is established.

Task offloading pertains to moving compute tasks to an external computing device to be performed on that device. IoT devices may include microprocessor-based controllers with limited storage, for storing a program of a size, and sub-optimal processing speed, in cycles per unit time. Subsequently, processing for large tasks has tended to be offloaded for processing in the cloud. However, offloading to the cloud suffers from latency and sometimes communication reliability issues. Fog computing brings an external computing resource closer to the IoT environment which greatly reduces latency, but is not without its own resource allocation issues. The disclosed Fog computing solution involves offloading tasks from disparate types of IoT devices to Fog servers, which themselves have limited resources.

The disclosed Fog computing approach to offloading IoT tasks to Fog servers is applicable to various types of IoT systems, ranging from smart homes to smart cities, smart power grids, and specialized systems such as video surveillance and healthcare. The disclosed Fog computing approach can facilitate storage and computational services in future 6G networks.

A smart home may consist of a technology-controlled ventilation and heating system such as the Nest Learning Thermostat, smart lighting, programmable shades and sprinklers, smart intercom systems to communicate with people indoors as well as those at the door, and an intelligent alarm system. The disclosed Fog computing approach can be used to create a personalized alarm system. It can also be used to automate certain events, such as turning on water sprinklers based on time and temperature.

Smart power grids are being implemented to help control power routing and monitor power usage. Smart power grids typically rely on the Internet for control and data communication. The disclosed Fog computing approach can be used to offload control functions and data storage to Fog nodes to enable localized power usage monitoring and control.

Smart cities are being considered to automate various services, from garbage collection to traffic management. The disclosed Fog computing approach is particularly applicable when it comes to traffic regulation. Sensors can be set up at traffic signals and road barriers for detecting pedestrians, cyclists, and vehicles. Speedometers can measure how fast vehicles are traveling and other motion and proximity sensors can serve to warn of potential dangerous conditions. These various sensors can use wireless and cellular technology to collate data. The disclosed Fog computing approach can be used to operate traffic signals to automatically turn red or stay green for a longer time based on the information processed from these sensors.

The disclosed Fog computing approach can be used in video surveillance, as video is complex to handle at the video camera device and continuous streams of videos are large and cumbersome to transfer across networks to the cloud. The nature of the involved data results in latency problems and network challenges. Costs also tend to be high for storing media content. Video surveillance is used in shopping areas and other large public areas and has also been implemented in the streets of numerous communities. Using the Fog computing approach, computing offloaded to Fog nodes can detect anomalies in crowd patterns and automatically alert authorities if they detect certain actions in the video footage.

The healthcare industry is one of the most governed industries, with regulations such as HIPAA being mandatory for hospitals and healthcare providers. The healthcare industry is always looking to innovate and address emergencies in real-time. Emergencies can arise in a hospital facility, such as a drop in vitals, or can occur at a patient's home. Data from wearables, blood glucose monitors, and other health apps can be monitored in the IoT devices to look for signs of bodily distress.

However, these monitoring functions may require complex processing in order to identify a potentially critical situation. The disclosed Fog computing approach can be applied to offload the complex processing task to Fog nodes without latency issues that may be critical in a situation, such as a stroke. As an example, in one embodiment, wherein the IoT environment is a healthcare environment, a wireless device includes an associated a heart monitor. The heart monitor monitors heart condition and when the condition indicates a potential critical condition, the wireless device associated with the heart monitor will assign a priority of urgent to a heart condition identification task to be offloaded to a Fog server. The invention enables all health-related tasks to be computed in a timely manner while maximizing the utilization of the fog node computing resources. The invention will allow computing load at the fog nodes to be efficiently managed and hence, fog nodes will enhance quality of service in terms of low task computing time.

In an industrial IoT application, machine health monitoring is critical for timely maintenance of machines. Machines can be wireless devices and their fault diagnosis related tasks can be offloaded to fog nodes. Fog servers can be placed to timely compute fault diagnosis tasks and provide maintenance related feedback about the machines.

Figure 6:
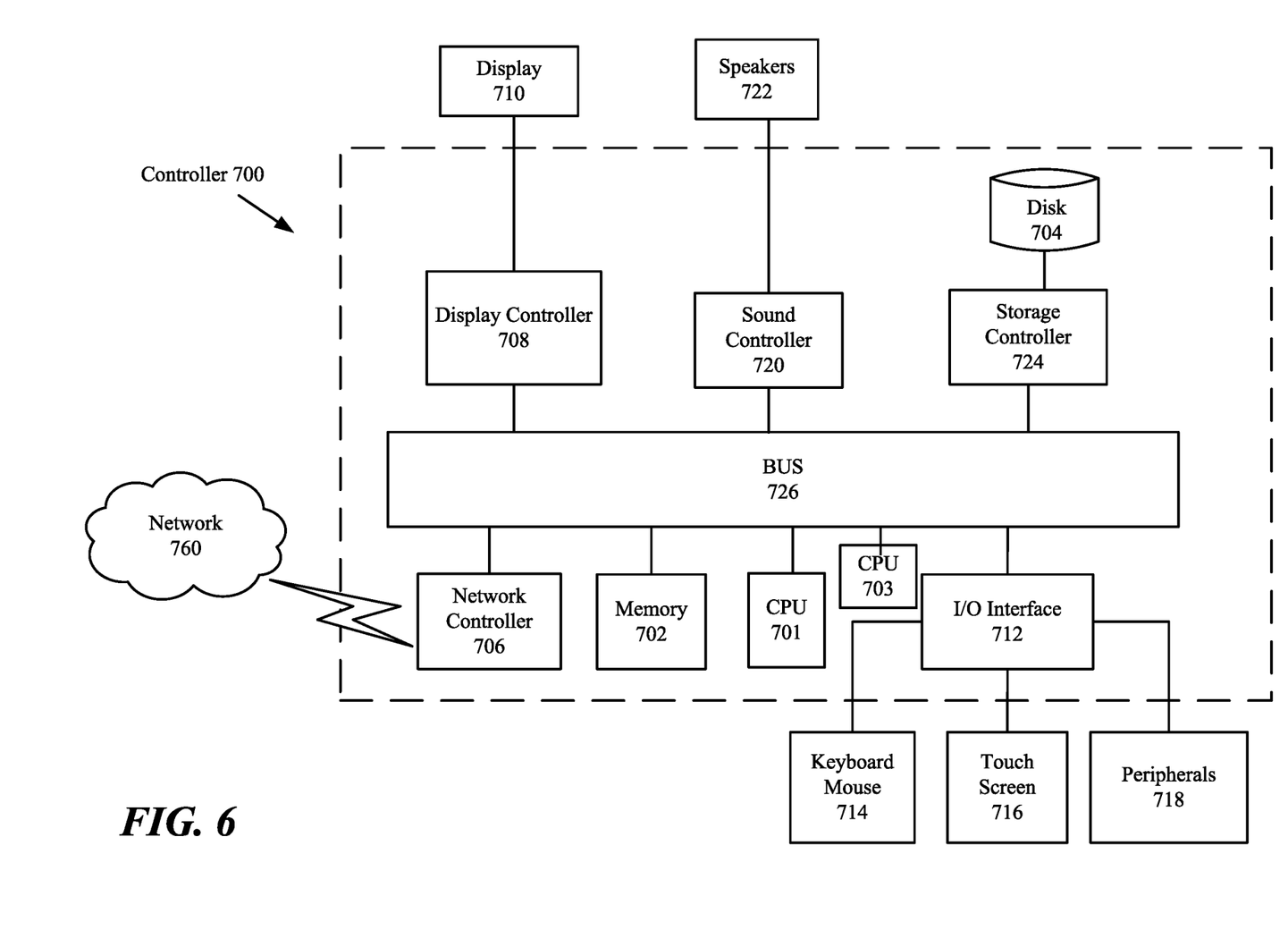
FIG. 6 is an illustration of a non-limiting example of details of computing hardware used in the computing system, according to certain embodiments.

FIG. 6 illustrates details of the hardware description of a computing environment according to exemplary embodiments. In FIG. 6, a controller 700 is described is representative of the system in which the controller is a computing device which includes a CPU 701 which performs the processes described above. The process data and instructions may be stored in memory 702. These processes and instructions may also be stored on a storage medium disk 704 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 6 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G, 5G, or 6G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
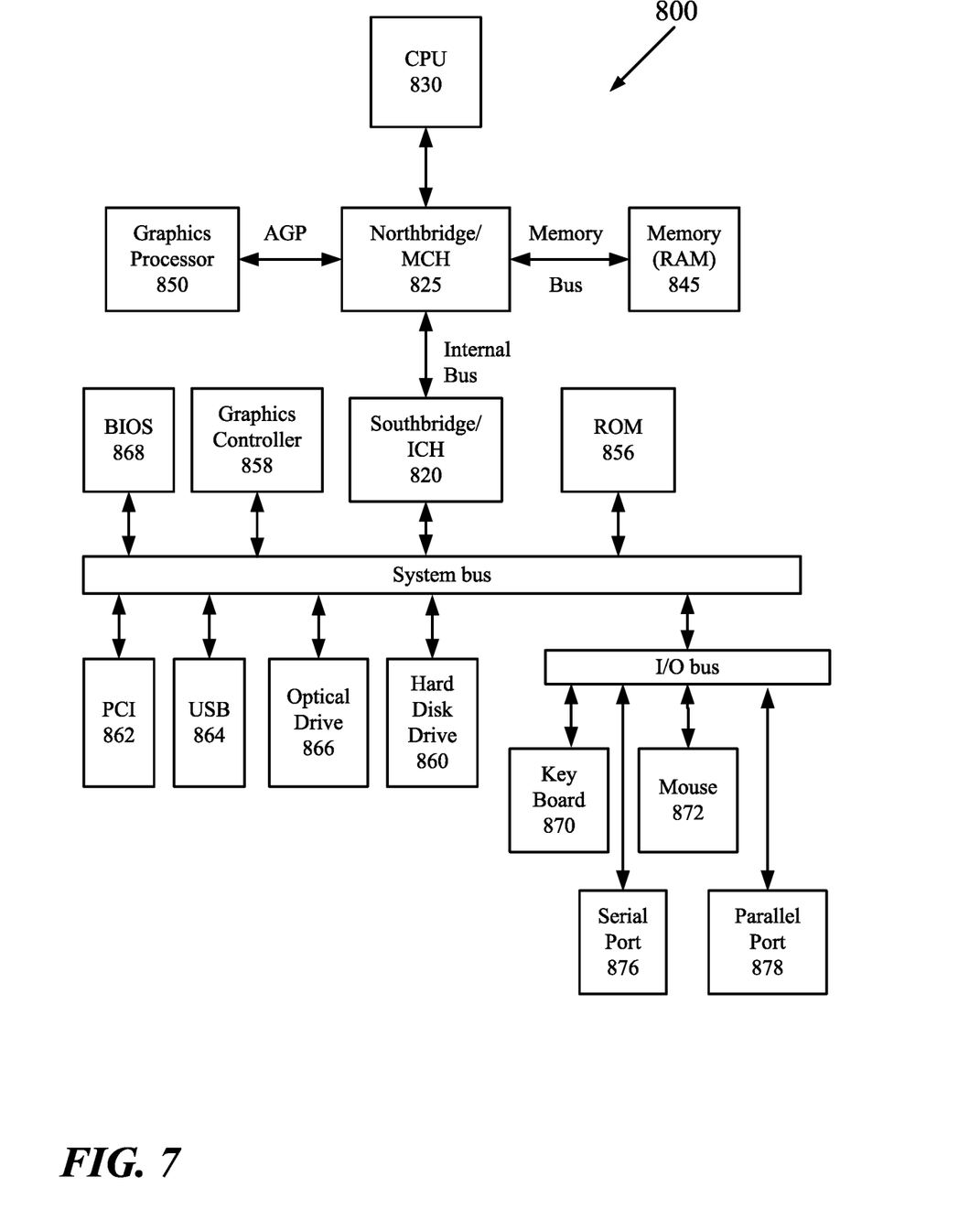
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 8:
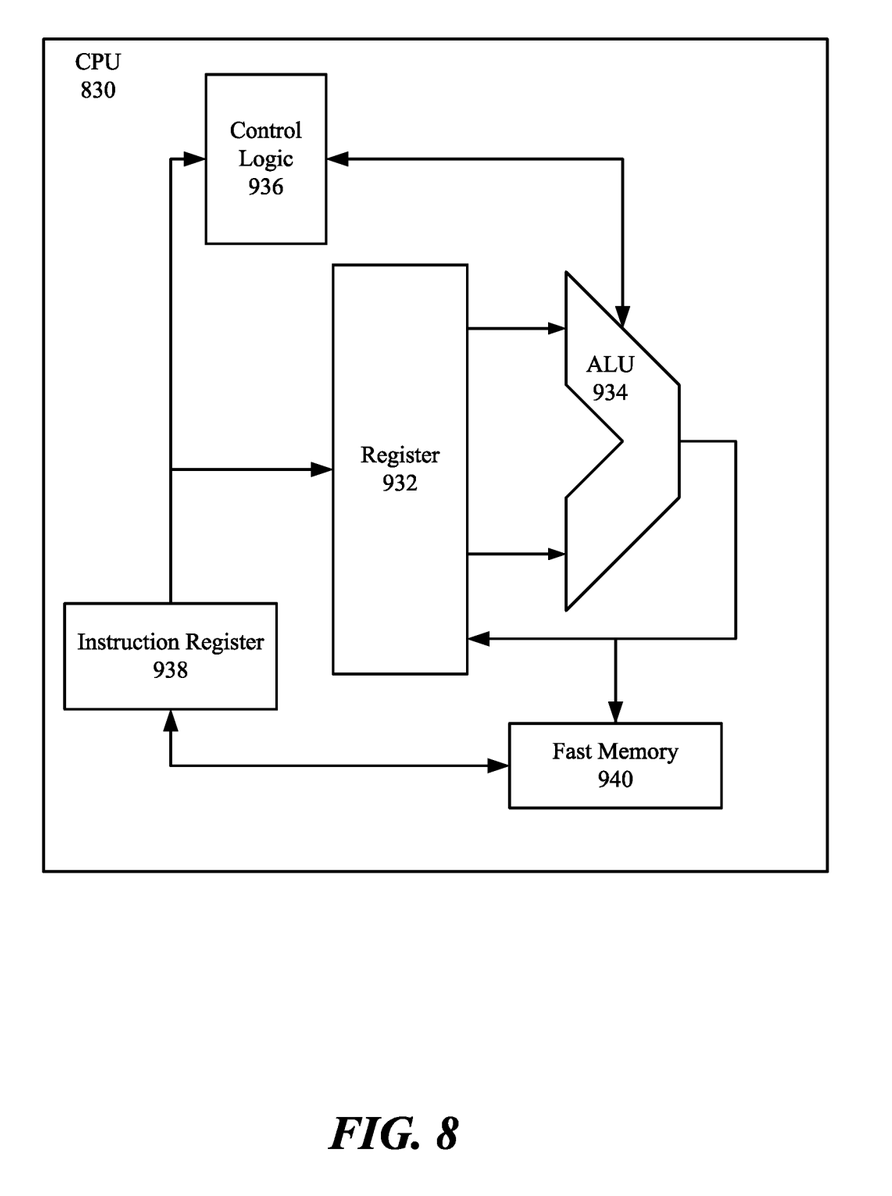
FIG. 8 is an exemplary schematic diagram of a processor used with the computing system, according to certain embodiments.

For example, FIG. 8 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of managing resources for computation in an Internet of Things (IoT) environment, comprising:
generating a plurality of tasks, by a plurality of wireless devices having respective antennas having operating frequency in a range 3 GHz to 10 THz, wherein each of the plurality of tasks have a size, in bytes, and have computation cycle requirements;
matching, by a central controller, wireless devices and Fog servers based on a IoT preference order of IoT task preferences by each Fog server and a Fog server preference order of Fog server preferences by each wireless device, in a manner that minimizes transmission delay between the plurality of wireless devices and the plurality of Fog servers, wherein the Fog servers are in a layer between the plurality of wireless devices and a cloud service;
offloading the plurality of tasks from respective wireless devices to matched Fog servers;
determining an order of task computation, among the generated plurality of tasks, in each Fog server using a knapsack algorithm with a knapsack representing limited computation cycles of a Fog server;
executing, in the Fog server, the tasks in the determined order of task computation; and
transmitting results of task execution to the respective wireless devices that offloaded the task.

2. The method of claim 1, further comprising generating, by the central controller, a signal strength table which contains average signal strength for connections between each wireless device to every Fog server.

3. The method of claim 2, further comprising determining the signal strength as a transmission power times antenna gain times square of wavelength over $(4\pi D)^2$, where D is a distance between a wireless device and a Fog server.

4. The method of claim 1, wherein the matching wireless devices and Fog servers includes determining the Fog server preference list of IoT tasks for each Fog server based on signal strength between the wireless device that generated the task and the Fog server.

5. The method of claim 4, wherein the matching wireless devices and Fog servers includes determining the task preference list of Fog servers for each IoT task based on a ratio of signal strength between the wireless device that generated the task and the Fog server and task size in bytes.

6. The method of claim 1, wherein the determining an order of task computation is determined with a constraint on a number of processing cycles for a Fog server.

7. The method of claim 1, wherein the IoT environment is a healthcare environment,
wherein at least one of the wireless devices includes an associated heart monitor, the method further comprising:
monitoring, by the heart monitor, heart condition, and when the condition indicates a potential threatening condition, assigning a priority of urgent, by the wireless device associated with the heart monitor, to a heart condition identification task to be offloaded to a Fog server.

8. The method of claim 1, wherein the matching, by a central controller, wireless devices and Fog servers includes associating a plurality of wireless devices with a single Fog server.

9. The method of claim 1, further comprising offloading the generated tasks to the Fog servers, and executing the offloaded tasks by the Fog servers.

10. The method claim 1, wherein the step of matching is performed each time a predetermined number of tasks are generated.

11. A system for managing resources for computation in an Internet of Things (IoT) environment, comprising:
a plurality of wireless devices having respective antennas with operating frequency in a range 3 GHz to 10 THz, wherein the wireless devices include at least one mobile device;

a plurality of Fog servers having respective antennas with operating frequency in a range 3 GHz to 10 THz, wherein the Fog servers are positioned in a layer that provides interoperability between the plurality of wireless devices and a cloud service;

a Fog node controller; and a wireless communication network for communication, by millimeter waves or submillimeter waves, between the plurality of wireless devices, the plurality of Fog servers and the Fog node controller, where distance between the at least one mobile device and Fog servers varies and is dynamic, wherein the plurality of wireless devices are configured with application-related IoT tasks, wherein the Fog servers are configured to provide computation resources to compute the IoT tasks, where each of the IoT tasks are of various sizes, in bytes, and have computation cycle requirements, wherein the Fog node controller is configured to manage computation of the IoT tasks, for each Fog server that are constrained to execution of a predetermined number of Fog server computation cycles that are performed in parallel, and wherein the Fog node controller is configured to execute a stable matching algorithm that balances associations between a subset of the plurality of wireless devices per single said Fog server based on a preference order of Fog servers by each wireless device, and based on a preference order of tasks by each Fog server, in a manner that minimizes transmission delay between the plurality of wireless devices and the plurality of Fog servers.

12. The system of claim 11, wherein the IoT environment is a healthcare environment, wherein at least one of the wireless devices includes an associated a heart monitor;

wherein the heart monitor monitors heart condition and when the condition indicates a potential life-threatening condition, the wireless device associated with the heart monitor is configured to assign a priority of urgent to a heart condition identification task to be offloaded to a Fog server.

13. The system of claim 11, wherein the Fog node controller is configured to maintain a signal strength table which stores average signal strength for connections between each wireless device to every Fog server, where signal strength equals transmission power times antenna gain times square of wavelength over $(4\pi D)^2$, where D is distance between a wireless device and a Fog server.

14. The system of claim 11, wherein each Fog server is configured to execute a task computing algorithm that allocates an IoT task out of its queue to a current computing cycle of the Fog server, and wherein each Fog server is configured to allocate the IoT task in an order of IoT tasks in accordance with a 0/1 Knapsack algorithm.

15. The system of claim 11, wherein each wireless device is configured to assign a task priority to each generated task, aid wherein the Fog server is configured to determine an order of task computation based on the task priority of each generated task and a time to generate each task.

16. The system of claim 11, wherein the Fog node controller is configured execute the stable matching algorithm to associate wireless devices and Fog servers based on a IoT preference list of IoT task preferences for each Fog server and a Fog server preference list of Fog server preferences for each IoT task.

17. The system of claim 16, wherein the Fog node controller is further configured to associate wireless devices and Fog servers by determining the Fog server preference list of IoT tasks for each Fog server based on signal strength between the wireless device that generated the task and the Fog server.

18. The system of claim 17, wherein the Fog node controller is further configured to associate wireless devices and Fog servers by determining the task preference list of Fog servers for each IoT task based on a ratio of signal strength between the wireless device that generated the task and the Fog server and task size in bytes.

19. The system of claim 11, wherein the Fog node controller is further configured to execute the stable matching algorithm each time a predetermined number of application-related tasks are generated.

* * * * *

UNITED STATES PATENT AND TRADEMARK OFFICE
CERTIFICATE OF CORRECTION

Page 1 of 1

PATENT NO. : 12,244,517 B1
APPLICATION NO. : 18/657591
DATED : March 4, 2025
INVENTOR(S) : Abdul Khader Jilani Saudagar et al.

It is certified that error appears in the above-identified patent and that said Letters Patent is hereby corrected as shown below:

On the Title Page

Item (72), in "Inventors", Lines 2-3, for Inventor Muhammad Awais Javed, delete "Riyadh (SA)" and insert -- Islamabad (PK) --.

Item (72), in "Inventors", Lines 3-4, for Ahmad Naseem Alvi, delete "Riyadh (SA)" and insert -- Islamabad (PK) --.

Signed and Sealed this
Seventeenth Day of June, 2025

Coke Morgan Stewart
*Acting Director of the United States Patent and Trademark Office*